US005528259A

United States Patent [19]
Bates et al.

[11] Patent Number: 5,528,259
[45] Date of Patent: Jun. 18, 1996

[54] METHOD AND SYSTEM FOR MULTI-DIMENSIONAL SCROLLING OF DISPLAYED DATA COLLECTIONS IN A DATA PROCESSING SYSTEM

[75] Inventors: Cary L. Bates, Rochester; Jeffrey M. Ryan, Byron, both of Minn.

[73] Assignee: International Business Machines Corporation, Armonk, N.Y.

[21] Appl. No.: 968,604

[22] Filed: Oct. 29, 1992

[51] Int. Cl.$^6$ ................................................. G09G 5/38
[52] U.S. Cl. ................................. 345/121; 345/125
[58] Field of Search ................... 340/709, 706, 340/710, 721, 722, 723, 724, 726, 731; 345/119, 120, 123, 145, 146, 157, 121, 125, 124; 395/159, 158, 157, 156, 155

[56] References Cited

U.S. PATENT DOCUMENTS

| | | | |
|---|---|---|---|
| 4,899,292 | 2/1990 | Montagna et al. | 340/724 |
| 4,965,558 | 10/1990 | Saki et al. | 345/156 |
| 5,142,275 | 8/1992 | Rockel | 340/709 |
| 5,196,838 | 3/1993 | Meier et al. | 340/724 |
| 5,202,961 | 4/1993 | Mills et al. | 395/159 |
| 5,317,687 | 5/1994 | Torres | 395/159 |
| 5,333,256 | 7/1994 | Green et al. | 395/159 |

FOREIGN PATENT DOCUMENTS

| | | | |
|---|---|---|---|
| 1-193786 | 8/1989 | Japan | 345/120 |
| 2-204786 | 8/1990 | Japan | 345/120 |

OTHER PUBLICATIONS

Cowart, Robert, *Mastering Windows™ 3.1 Special Edition*, 1992, pp. 65 and 82.

Primary Examiner—Tommy P. Chin
Assistant Examiner—A. Au
Attorney, Agent, or Firm—Andrew J. Dillon

[57] ABSTRACT

A method and system are disclosed for permitting multi-dimensional scrolling of overlapping data collections which are displayed in multiple layers or in a simulated three-dimensional manner within a data processing system. A moveable and selectable control icon, such as the scroll box, is displayed within a scroll bar in the data processing system in association with a display of a portion of a selected data collection. The portion of the selected data collection which is displayed may be scrolled in a vertical or horizontal direction by moving a control icon in a so-called "drag and drop" technique or by designating a new location within the scroll bar utilizing a graphical pointing device, such as a mouse. A display of a portion of an alternate data collection may be provided in response to a selection and manipulation of the scroll box by a user and the physical appearance of the depth of the scroll box is altered to provide a graphic indication of relative display position within the multiple layers of data collections thus displayed.

6 Claims, 6 Drawing Sheets

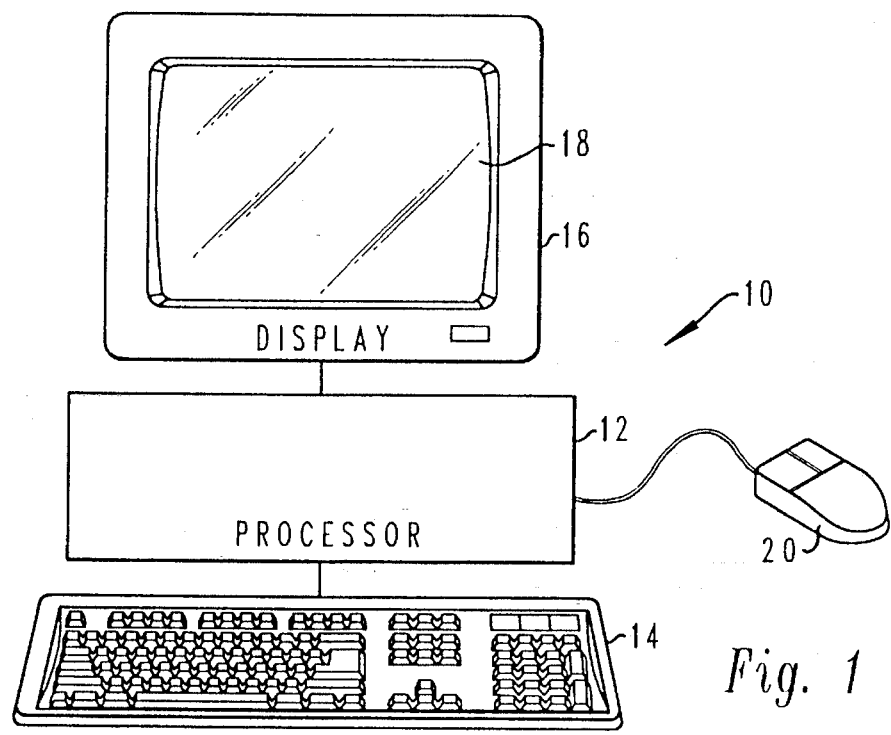
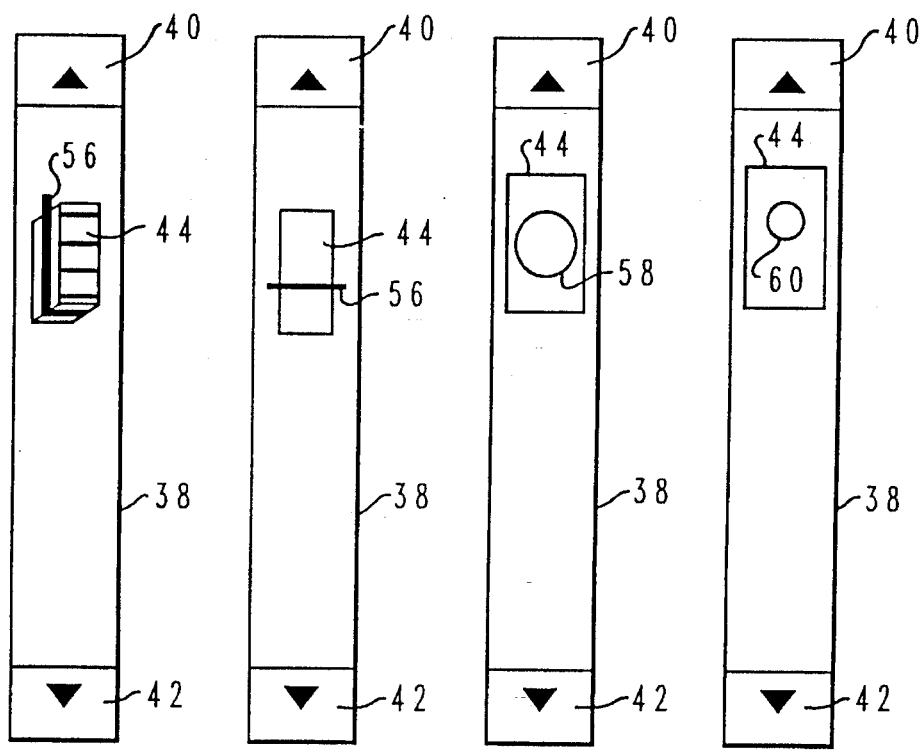
Fig. 5   Fig. 6   Fig. 7   Fig. 8

Fig. 3A

| A1 | A | B | C | D | E | F |
|---|---|---|---|---|---|---|
| 1 | | 1992 Monthly Summary, January | | | | |
| 2 | | | | | | |
| 3 | Net sales | $404,892 | | | | |
| 4 | Total expenses | $429,485 | | Income tax rate | 37.4% | |
| 5 | | | | Taxes on income | ($9,198) | |
| 6 | Operating income | ($24,593) | | | | |
| 7 | | | | | | |
| 8 | | | | | | |
| 9 | Net income | ($15,395) | | | | |
| 10 | | | | | | |
| 11 | Earnings | ($0.28) | | | | |
| 12 | Shares outstanding | 55,211 | | | | |
| 13 | | | | | | |

Fig. 3B

| A1 | A | B | C | D | E | F |
|---|---|---|---|---|---|---|
| 1 | | 1992 Monthly Summary, November | | | | |
| 2 | | | | | | |
| 3 | Net sales | $837,947 | | | | |
| 4 | Total expenses | $694,737 | | Income tax rate | 37.4% | |
| 5 | | | | Taxes on income | $53,561 | |
| 6 | Operating income | $143,210 | | | | |
| 7 | | | | | | |
| 8 | | | | | | |
| 9 | Net income | $89,649 | | | | |
| 10 | | | | | | |
| 11 | Earnings | $1.62 | | | | |
| 12 | Shares outstanding | 55,211 | | | | |
| 13 | | | | | | |

METHOD AND SYSTEM FOR MULTI-DIMENSIONAL SCROLLING OF DISPLAYED DATA COLLECTIONS IN A DATA PROCESSING SYSTEM

BACKGROUND OF THE INVENTION

1. Technical Field:

The present invention relates in general to improved data processing systems and in particular to improvements in data manipulation within a data processing system. Still more particularly the present invention relates to improvements in multi-dimensional scrolling of displayed data within a data processing system.

2. Description of the Related Art:

The manipulation of data in a data processing system is well known in the prior art. Data may be manipulated in many ways in a modern state-of-the-art data processing system including: data accessing; data encoding; data communications; data compression; data conversion; data entry; data exchange; data filing; data linking; data locking; data manipulation; data mapping; data modeling; data processing; data recording; data sorting; and data transferring. The large amounts of data which are available to the user of a modern state-of-the-art data processing system often become overwhelming in magnitude and complexity.

As a result of the increasing complexity of data processing systems attempts have been made to simplify the interface between a user and the large amounts of data present within a modern data processing system. One example of an attempt to simplify the interface between a user and a data processing system is the utilization of a so-called Graphical User Interface (GUI) to provide an intuitive and graphical interface between the user and the data processing system. The Common User Access (CUA) user interface is one example of such a Graphical User Interface. Common User Access is a trademark of the International Business Machines Corporation. The Common User Access (CUA) user interface is often utilized to organize and present large amounts of data to a user in a graphical and intuitive manner.

One technique for presenting a list of objects or settings choices to a user wherein multiple objects may be selected is the utilization of the so-called "List Box." A List Box is typically utilized to display a list of settings choices or objects in which the number of choices or objects may vary. A List Box generally displays the settings choices or objects in an order that is meaningful to the user, such as alphabetic order, numeric order, chronological order or some other order. For example, modem baud rates are often displayed in numeric order. Typically such List Boxes are large enough to display a plurality of choices, such as six or eight, and such boxes often include vertical or horizontal scroll bars, if the data is too large to be entirely visible within the List Box.

A scroll bar is a known user interface component which is associated with a scrollable area of a display that indicates to a user that more information is available and may be added in a particular direction with respect to the display. A scroll bar may be utilized to scroll additional data into view and a scroll bar typically includes a scroll box, a shaft and scroll buttons.

Another relatively recent advance in the computer arts allows a user to simultaneously access, display and manipulate data from a variety of related and/or unrelated computer application programs. This process is generally referred to as "multi-tasking." In a true multi-tasking system, several application programs are active simultaneously. Displays from each of these applications may be provided within a two-dimensional display system by presenting overlapping data collections in multiple layers in a simulated three-dimensional manner within a data processing system. Each of these layers presents data associated with a particular data collection and these layers typically overlap and may partially or completely obscure each other and the data therein. There are, however, certain inherent problems in most such multi-tasking systems. In order to reach data which the user desires to manipulate, a user must often follow a different and sometimes complicated procedure for each application program and, within each program, at each level of data type, such as file, page, or word, which the user attempts to access. Consequently, the user faces a loss of time due to the number of keystrokes necessary simply to obtain a visual image of a particular data collection in such an overlapping simulated three-dimensional display.

Thus, those skilled in the data-processing art will appreciate that while simple lists of objects or settings choices or overlapping windows may be displayed in a Graphical User Interface, the types of data which are displayable within such a scrollable list are typically limited to a simple column of possible choices or objects and, in more complex data collections such as those which may be displayed within a window, the techniques necessary to visually access that data are often complex and time consuming.

Therefore, it should be apparent that a need exists for a method and system which permits multi-dimensional scrolling of displayed data collections within a data processing system.

SUMMARY OF THE INVENTION

It is therefore one object of the present invention to provide an improved data processing system.

It is another object of the present invention to provide an improved method and system for data manipulation within a data processing system.

It is yet another object of the present invention to provide an improved method and system for multi-dimensional scrolling of displayed data within a data processing system.

The foregoing objects are achieved as is now described. The method and system of the present invention permit multi-dimensional scrolling of overlapping data collections which are displayed in multiple layers or in a simulated three-dimensional manner within a data processing system. A moveable and selectable control icon, such as a scroll box, is displayed within a scroll bar in the data processing system in association with a display of a portion of a selected data collection. The portion of the selected data collection which is displayed may be scrolled in a vertical or horizontal direction by moving a control icon in a so-called "drag and drop" technique or by designating a new location within the scroll bar utilizing a graphical pointing device such, as a mouse. A display of a portion of an alternate data collection may be provided in response to a selection and manipulation of the depth of the scroll box by a user and the physical appearance of the scroll box is altered to provide a graphic indication of relative display position within the multiple layers of data collections thus displayed.

The above as well as additional objects, features and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a pictorial representation of a computer system which may be utilized to implement the method and system of the present invention;

FIGS. 3a and 3b are pictorial representations which illustrate the manipulation of multiple layers of data utilizing the method and system of the present invention;

FIG. 5 is a pictorial representation of a multi-dimensional scroll bar which may be utilized to implement the method and system of the present invention;

FIG. 6 is a pictorial representation of an alternate embodiment of the multi-dimensional scroll bar of FIG. 5;

FIG. 7 represents a second alternate embodiment of a multi-dimensional scroll bar which may be utilized to implement the method and system of the present invention;

FIG. 8 is a pictorial representation of the multi-dimensional scroll bar of FIG. 7, after selection and depth manipulation, in accordance with the method and system of the present invention.

DETAILED DESCRIPTION OF THE INVENTION

Figure 2:
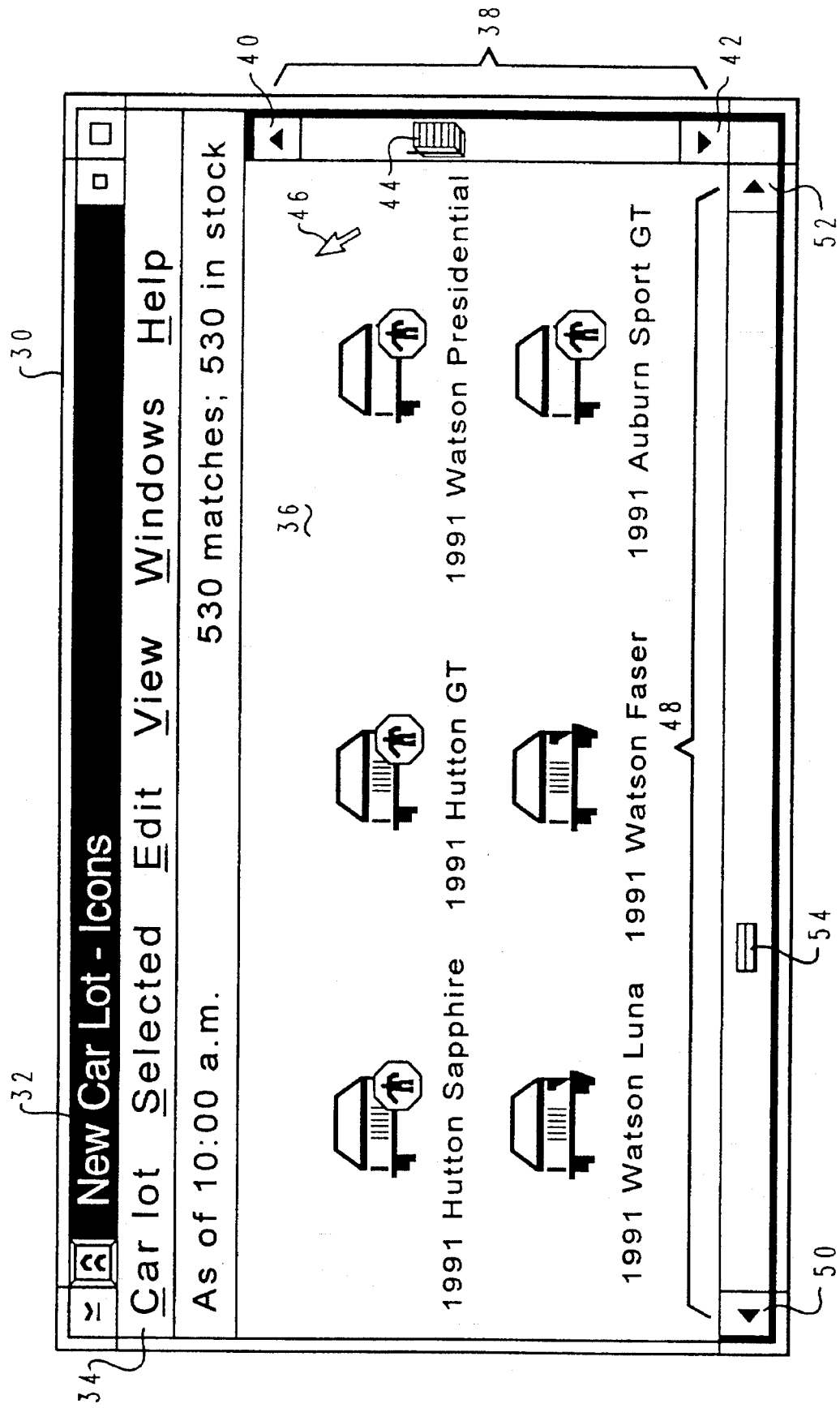
FIG. 2 is a pictorial representation of the display of a portion of a data collection which may be manipulated utilizing the method and system of the present invention.

With reference now to the figures and in particular with reference to FIG. 1, there is depicted a pictorial representation of a computer system 10 which may be utilized to implement the method and system of the present invention. As is illustrated, computer system 10 preferably includes a processor 12 which is coupled to a keyboard 14 and display device 16 in a manner well known in the art. Display device 16 preferably includes a display screen 18. Those skilled in the art will appreciate that computer system 10 may be implemented by utilizing any suitable computer including mainframe computers, mini computers, and so-called "personal computers." or workstations which are coupled to a mainframe host computer. One example of a computer system which may be utilized to implement the method and system of the present invention is the International Business Machines Corporation PS/2 or RS/6000.

Referring now to FIG. 2, there is depicted a pictorial representation of the display of a portion of a data collection which may be manipulated in accordance with the method and system of the present invention. As depicted, a window 30 is provided which includes a display area 36, which may be utilized to display a portion of a data collection. As illustrated, the data collection depicted therein may include textual data, graphic data or image data, or combinations thereof. As is typical in such display windows a title bar 32 is provided and utilized to present a title which may be utilized by the user to designate a particular data collection. Additionally, a menu bar 34 is provided. Those familiar with Graphical User Interfaces will appreciate that a command within menu bar 32 may be selected graphically, utilizing mouse pointer 46, or by the selection of a particular key which is associated with a selected command. Typically, by selecting a particular command within menu bar 34 a so-called "drop down" command list is generally provided and utilized to display individual commands under a particular general command which may be selected by the user.

As is typical in data collection display systems of the type set forth within FIG. 2, window 30 includes associated therewith a vertical scroll bar 38. Vertical scroll bar 38 may be utilized to scroll the presentation of data within display area 36 in a vertical direction utilizing any of several methods well known in the art. For example, scroll buttons 40 and 42 may be graphically selected, utilizing mouse pointer 46, to cause the display of an upper or lower portion of a data collection which is currently imaged within display area 36.

Present within vertical scroll bar 38 is multi-dimensional scroll box 44. Multi-dimensional scroll box 44 may be utilized, in a manner which will be explained in greater detail herein, to scroll the portion of the displayed data collection within display area 36 in a vertical mode or, to select a different layer of data collection within multiple layers which are related or which are presented in a simulated three-dimensional manner.

As illustrated, the window depicted within FIG. 2 also includes a horizontal scroll bar 48 which, as described above with respect to vertical scroll bar 38, includes scroll buttons 50 and 52 and a scroll box 54. As those skilled in the art will appreciate, the portion of the data collection visible within display area 36 may be scrolled in a horizontal direction utilizing horizontal scroll bar 48 by selecting either scroll buttons 50 or 52, graphically manipulating scroll box 54 in a so-called "drag and drop" manner or by designating a point within horizontal scroll bar 48 utilizing mouse pointer 46 and causing scroll box 54 to be relocated to that point.

Upon reference to FIG. 2 those skilled in the art will appreciate that the scrolling technique described therein may be utilized to permit various areas within the data collection displayed within display area 36 to be imaged within display area 36 by scrolling that area in a vertical or horizontal direction, in a manner well known in the art. However, multi-dimensional scroll box 44 may be utilized in a manner which will be explained in greater detail below to cause the selection of an alternate layer within the multiple layers of data collections which are related or which are displayed in a simulated three-dimensional manner. Additionally, in place of utilizing both a vertical and horizontal scroll bar a single multi-dimensional scroll bar may be provided which may be utilized to scroll the image both vertically and horizontally, in addition to a "Z-axis" scroll, such as described below. This may be accomplished, for example, by providing a scroll bar having both horizontal and vertical dimensions.

With reference now to FIGS. 3a and 3b, there are depicted pictorial representations which illustrate the manipulation of multiple layers of data utilizing the method and system of the present invention. As illustrated in FIG. 3a, a display area 36 is depicted which includes spread sheet data for a monthly summary for the month of January. As described above with respect to FIG. 2, display area 36 includes associated therewith a vertical scroll bar 38. Vertical scroll bar 38 may be utilized to scroll the presentation of the data within display area 36 in a vertical direction utilizing any of several methods well known in the art. For example, scroll buttons 40 and 42 may be graphically selected, utilizing mouse pointer 46, to cause the display of an upper or lower portion of a data collection which is currently imaged within display area 36.

As described above, present within vertical scroll bar 38 is a multi-dimensional scroll box 44. Multi-dimensional scroll box 44 may be utilized, in a manner which will be described in greater detail herein, to scroll the portion of the displayed data collection within display area 36 in a vertical mode, or to select a different layer of data collection within multiple layers which are presented within display area 36.

Thus, as illustrated within FIG. 3b, multi-dimensional scroll box 44 has been manipulated to cause the selection of an alternate layer within multiple layers of data collection. By selecting multi-dimensional scroll box 44, the display within display area 36 has been modified to display an alternate monthly summary for the spread sheet data contained therein. Upon reference to the foregoing those skilled in the art will appreciate that by utilizing multi-dimensional scroll box 44, a user may rapidly and efficiently alter the display within display area 36 to depict any of multiple layers of display, such as the monthly summaries typically associated with spread sheet data in the manner depicted within FIGS. 3a and 3b.

Figure 4A:
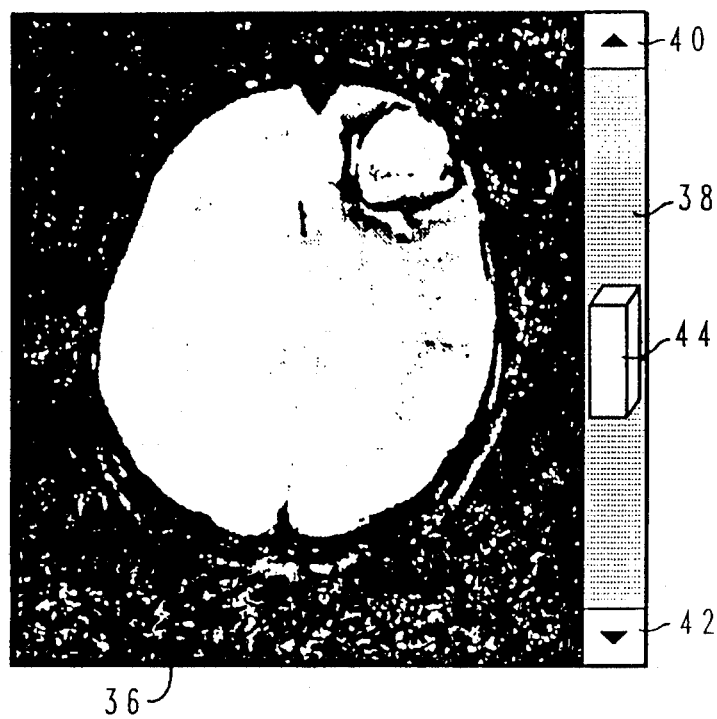
FIGS. 4a–4c are pictorial representations which illustrate the manipulation of three-dimensional data utilizing the method and system of the present invention.
Figure 4B:
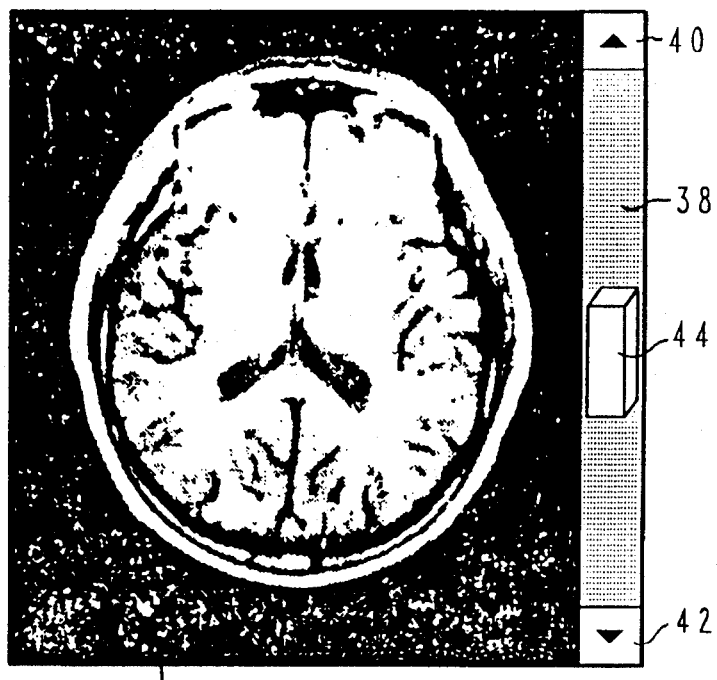
Figure 4C:
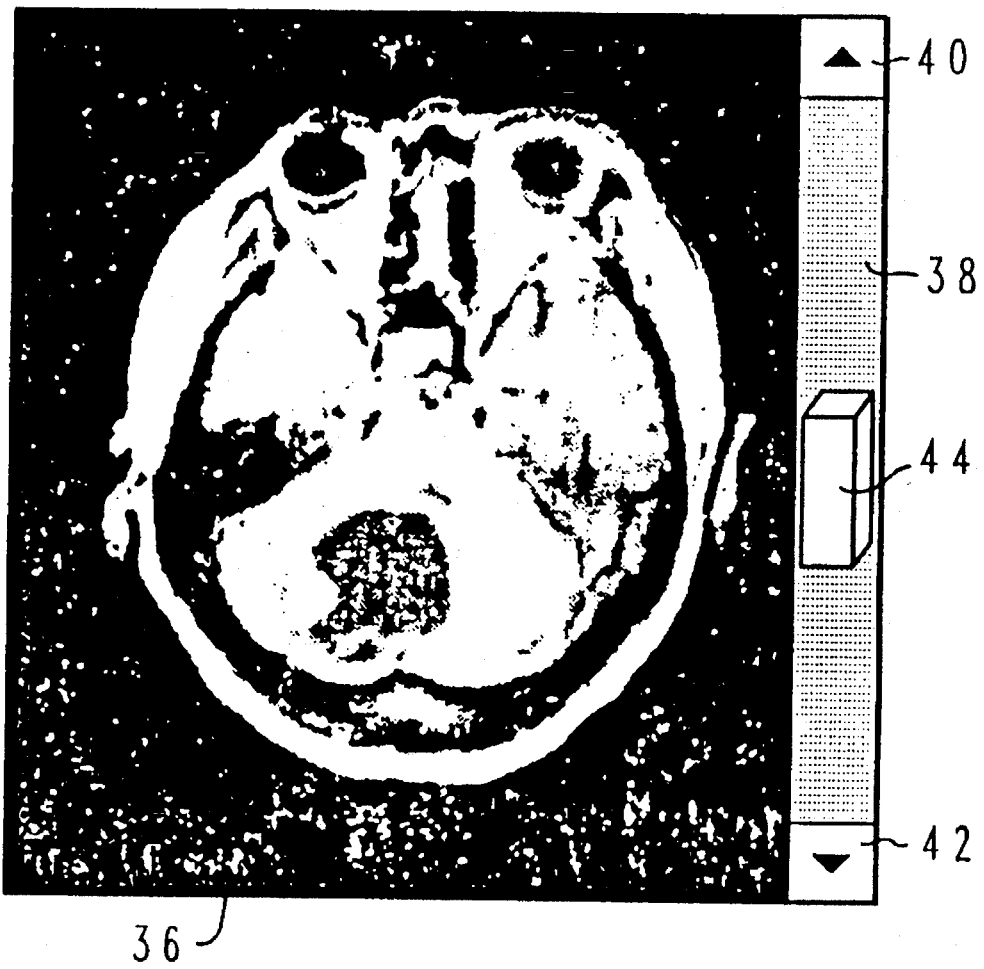

Referring now to FIGS. 4a–4c, a pictorial representation is illustrated which depicts the manipulation of three-dimensional data utilizing the method and system of the present invention. In the depicted embodiment within FIGS. 4a–4c, a graphic image similar to that which may be obtained utilizing a computerized axial tomography (CAT) scan is illustrated. By manipulating multi-dimensional scroll box 44, in accordance with the method and system of the present invention, selected layers within the three-dimensional data plot which represents the computerized axial tomography (CAT) scan may be rapidly and efficiently depicted within display area 36. As will be appreciated by those skilled in the art upon reference to the foregoing, multi-dimensional scroll box 44 may therefore be utilized to rapidly and efficiently vary the display within display area 36 to provide a pictorial representation of one of selected multiple layers of data, in the manner described with respect to FIGS. 3a and 3b, or one of multiple layers of a three-dimensional data collection, as illustrated within FIGS. 4a–4c, in a graphical and intuitive manner.

With reference now to FIG. 5 there is depicted an enlarged graphical illustration of vertical scroll bar 38 which depicts in greater detail the appearance of multi-dimensional scroll box 44. As illustrated, vertical scroll bar 38 still includes scroll buttons 40 and 42, in addition to multi-dimensional scroll box 44. However, upon reference to FIG. 5 those skilled in the art will appreciate that multi-dimensional scroll box 44 is displayed in a simulated three-dimensional manner and includes depth cue 56. Depth cue 56 may be utilized to provide a graphic indication of relative display position within multiple layers of data collections in a manner which will be illustrated herein.

In the depicted embodiment of the present invention multi-dimensional scroll box 44 may be operated in the "Z-axis" to select alternate layers within multiple layers of data collections which are related or which are displayed in a simulated three-dimensional display by graphically selecting multi-dimensional scroll box 44, utilizing any suitable graphic selection device, such as mouse pointer 46. Having selected multi-dimensional scroll box 44 with mouse pointer 46 the multi-dimensional scrolling aspect of the present invention may be invoked by depressing the right button of mouse 20 (see FIG. 1) and thereafter moving mouse 20 in a so-called "drag and drop" manner.

By graphically selecting multi-dimensional scroll box 44, depressing the right mouse button and physically manipulating mouse 20 the relative position of multi-dimensional scroll box 44 with respect to depth cue 56 may be simply and efficiently altered. Of course, the apparent visual depth of multi-dimensional scroll box 44 may be limited to some maximum value to prevent the creation of a display which is too cumbersome.

Referring now to FIG. 6 there is depicted an enlarged view of an alternate embodiment of multi-dimensional scroll box 44. As illustrated herein, multi-dimensional scroll box 44 is a simple rectangle which may be manipulated in the manner described above relative to depth cue 56. That is, the graphical selection of multi-dimensional scroll box 44 coupled with the movement of mouse 20 (see FIG. 1) may be utilized to vary the relative position of multi-dimensional scroll box 44 with respect to depth cue 56.

With reference now to FIGS. 7 and 8 a second alternate embodiment of multi-dimensional scroll box 44 is illustrated. As depicted herein vertical scroll bar 38 includes a scroll cylinder 58 within scroll box 44. Upon graphic selection of scroll cylinder 58, utilizing the right mouse button, and a manipulation of mouse 20 (see FIG. 1), the relative size of scroll cylinder 58 may be varied, as depicted at reference numeral 60 of FIG. 6. Thus, the relative depth within a multi-layer or simulated three-dimensional display of data collections may be intuitively indicated by varying the perspective view of scroll cylinder 58 in the manner described.

While FIGS. 5, 6, 7 and 86 depict three different embodiments of multi-dimensional scroll box 44 those skilled in the art will appreciate that other techniques may also be utilized. In order to provide an intuitive and graphical user interface which permits the rapid and efficient navigation between multiple layers of data collections which are related or which are displayed within a it is simply necessary to add to the well known scroll box a variation in physical appearance which may be utilized to provide a graphic indication of relative display position within multiple layers of data collections, such as those depicted in FIGS. 5–8.

Figure 9:
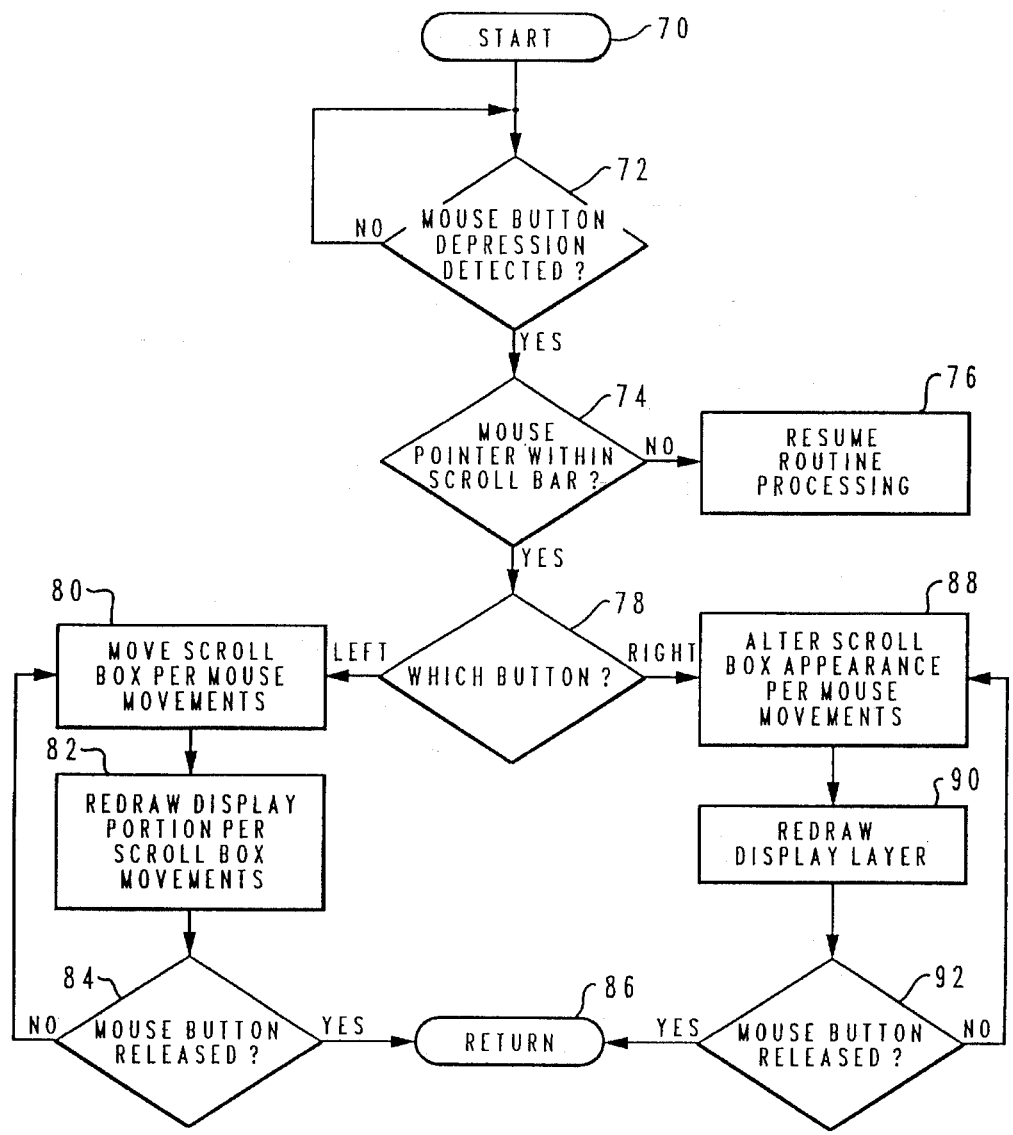
FIG. 9 is a high level logic flowchart illustrating the multi-dimensional scrolling of displayed data collections in accordance with the method and system of the present invention.

Finally, with reference to FIG. 9, there is depicted a high level logic flowchart which illustrates the method and system of the present invention. As depicted, the process begins at block 70 and thereafter passes to block 72. Block 72 illustrates a determination of whether or not a mouse button depression has been detected. If not, the process merely iterates until such time as a mouse button depression has been detected. After detecting the depression of a mouse button, as illustrated within block 72, the process passes to block 74. Block 74 illustrates a determination of whether or not the mouse pointer is within a scroll bar. If not, the process merely passes to block 76 and resumes routine processing.

However, in the event the mouse pointer is within a scroll bar when a depression of the mouse button has been detected, the process passes to block 78. Block 78 illustrates a determination of which mouse button has been depressed. Those skilled in the art will appreciate that a typical mouse includes a left mouse button and a right mouse button. In the event the left mouse button has been depressed the process passes to block 80 and thereafter executes a standard "drag and drop" operation, as will be described herein.

The "drag and drop" operation begins as illustrated at block 80 by moving the scroll box associated with that scroll bar in accordance with the movements of the mouse. Thereafter, the process passes to block 82 which illustrates the redrawing of the displayed portion of the data collection which is imaged within the display area, to display additional areas of the data collection in response to the scroll box movements. Next, the process passes to block 84. Block 84 illustrates a determination of whether or not the mouse button has been released and if not, the process returns iteratively to block 80. In the event the mouse button has been released the process passes to block 86 and terminates.

Referring again to block 78 an important feature of the present invention is illustrated. In the event the right mouse button has been depressed the process passes to block 88. Block 88 illustrates the altering of the scroll box appearance in accordance with the mouse movements. As those skilled in the art will appreciate upon reference to FIGS. 3–6, this may be accomplished utilizing many different techniques, so long as the altered appearance of the scroll box presents an intuitive display to the user of the relative position within multiple layers of data collections in a simulated three-dimensional display. After altering the scroll box appearance in accordance with the movements of a mouse, as illustrated at block 88, the process passes to block 90. Block 90 illustrates the redrawing of the display to depict a different display layer and the process then passes to block 92. Block 92 illustrates a determination of whether or not the mouse button has been released and if not, the process returns iteratively to block 88 and continues to scroll through the multiple layers of data collections in the manner described. In the event the mouse button has been released the process passes to block 86 and returns.

Upon reference to the foregoing those skilled in the art will appreciate that the applicants herein have provided a novel method and system which may be utilized for multi-dimensional scrolling of displayed data collections which are displayed in multiple layers or in a simulated three-dimensional manner. By the expedient of providing a variation in the physical appearance of a known scroll box, which provides a graphic indication of relative display position within multiple layers of data collections, a large amount of data may be simply and efficiently manipulated in not only a horizontal and vertical directions but throughout multiple layers of data collections or data which is displayed in a simulated three-dimensional manner.

While the invention has been particularly shown and described with reference to a preferred embodiment, it will be understood by those skilled in the art that various changes in form and detail may be made therein without departing from the spirit and scope of the invention.

What is claimed is:

1. A method of selectively manipulating a display of a plurality of overlapping data collections within a data processing system, said method comprising the steps of:

displaying a moveable and selectable control icon within a scroll bar within said data processing system;

altering a display of a portion of a selected one of said plurality of overlapping data collections in response to a movement of said moveable and selectable control icon within said scroll bar;

displaying at least a portion of an alternate one of said plurality of overlapping data collections in response to a selection and manipulation of said moveable and selectable control icon within said scroll bar; and altering an appearance aspect of said moveable and selectable control icon within said scroll bar in response to a selection of and manipulation of said moveable and selectable control icon within said scroll bar wherein a graphic indication of display position within said plurality of overlapping data collections is provided.

2. The method of selectively manipulating a display of a plurality of overlapping data collections within a data processing system according to claim 1 wherein said step of altering an appearance aspect of said moveable and selectable control icon within said scroll bar in response to a selection and manipulation of said moveable and selectable control icon comprises varying the display of said moveable and selectable control icon relative to a visual depth cue.

3. The method of selectively manipulating a display of a plurality of overlapping data collections within a data processing system according to claim 1 wherein said step of altering an appearance aspect of said moveable and selectable control icon within said scroll bar in response to a selection and manipulation of said moveable and selectable control icon comprises the step of varying the size of an element of said moveable and selectable control icon.

4. A data processing system for selectively manipulating a display of a plurality of overlapping data collections within said data processing system, said data processing system comprising:

means for displaying a moveable and selectable control icon within a scroll bar within said data processing system;

means for altering a display of a portion of a selective one of said plurality of overlapping data collections in response to a movement of said moveable and selectable control icon within said scroll bar;

means for displaying at least the portion of an alternate one of said plurality of overlapping data collections in response to a selection and manipulation of said moveable and selectable control icon within said scroll bar; and means for altering an appearance aspect of said moveable and selectable control icon within said scroll bar in response to a selection and manipulation of said moveable and selectable control icon wherein a graphic indication of display position within said plurality of overlapping data collections is provided.

5. The data processing system for selectively manipulating a display of a plurality of overlapping data collections within said data processing system according to claim 4 wherein said means for altering an appearance aspect of said moveable and selectable control icon within said scroll bar in response to a selection and manipulation of said moveable and selectable control icon comprises means for varying a display of said moveable and selectable control icon with respect to a visual depth cue.

6. The data processing system for selectively manipulating a display of a plurality of overlapping data collections within said data processing system according to claim 4 wherein said means for altering an appearance aspect of said moveable and selectable control icon within said scroll bar in response to a selection and manipulation of said moveable and selectable control icon within said scroll bar comprises means for altering the size of a display of an element of said moveable and selectable control icon within said scroll bar in response to a selection and manipulation of said moveable and selectable control icon within said scroll bar.

* * * * *